United States Patent [19]
Uchiyama

[11] Patent Number: 5,689,740
[45] Date of Patent: Nov. 18, 1997

[54] FOCUS DETECTION DEVICE

[75] Inventor: Shigeyuki Uchiyama, Tokyo, Japan

[73] Assignee: Nikon Corporation, Tokyo, Japan

[21] Appl. No.: 497,464

[22] Filed: Jun. 30, 1995

[30] Foreign Application Priority Data

Sep. 5, 1994 [JP] Japan .................. 6-211393

[51] Int. Cl.$^6$ .................. G03B 3/10; G03B 13/34
[52] U.S. Cl. .................. 396/101; 396/121
[58] Field of Search .................. 354/402, 406–408; 348/354–356; 396/121, 101

[56] References Cited

U.S. PATENT DOCUMENTS

| | | | |
|---|---|---|---|
| 4,561,749 | 12/1985 | Utagawa . | |
| 4,908,644 | 3/1990 | Shindo et al. | 354/402 |
| 5,128,706 | 7/1992 | Shindo et al. | 354/402 |
| 5,235,375 | 8/1993 | Yamana et al. | 354/400 |
| 5,258,801 | 11/1993 | Kusaka et al. . | |
| 5,357,310 | 10/1994 | Kawamura et al. | 354/408 |
| 5,359,383 | 10/1994 | Miida et al. | 354/402 |
| 5,369,436 | 11/1994 | Kawakami et al. | 348/355 |
| 5,404,013 | 4/1995 | Tajima | 250/332 |
| 5,467,163 | 11/1995 | Uchiyama | 354/402 |
| 5,469,240 | 11/1995 | Uchiyama et al. | 354/406 |
| 5,485,002 | 1/1996 | Kusaka | 250/201.8 |
| 5,485,003 | 1/1996 | Kusada | 250/201.8 |

FOREIGN PATENT DOCUMENTS

| | | |
|---|---|---|
| 60-37513 | 2/1985 | Japan . |
| 60-262004 | 12/1985 | Japan . |
| 61-245123 | 10/1986 | Japan . |
| 2-178641 | 7/1990 | Japan . |
| 4-235512 | 8/1992 | Japan . |

*Primary Examiner*—Safet Metjahic
*Assistant Examiner*—Eric Nelson
*Attorney, Agent, or Firm*—Oliff & Berridge

[57] ABSTRACT

A focus detection device to improve the level of confidence of focus detection results of an object image by determining the defocus amount based on the filter processing data computed by a filter processing circuit for high frequencies of the subject image is disclosed. Computations may be repeated related to successively lower frequencies until a high level of confidence of the computed defocus amount is achieved.

16 Claims, 14 Drawing Sheets

FOCUS DETECTION DEVICE

BACKGROUND OF THE INVENTION

1. Field of the Invention

The present invention relates to focus detection devices for use in cameras and in video equipment.

2. Description of Related Art

A focus detection device of a camera using a phase differential detection method is well known. FIG. 11 shows an outline of a focus detection device using a phase differential detection method. Light rays entering from area 101 in the phototaking lens 100 pass through a field mask 200, a field lens 300, an aperture stop unit 401, and a re-imaging lens 501 and form an image on an image sensor array A formed of a plurality of photo-electric conversion elements, arranged in a one-dimensional line, producing an output corresponding to the incident intensity. Similarly, light rays entering from region 102 in the phototaking lens 100 pass through the field mask 200, the field lens 300, the aperture stop unit 402, and the re-imaging lens 502 that forms an image on the image sensor array B. The pair of object images thus formed on the image sensor arrays, row A and row B, move away from each other during the so-called front focus condition in which the phototaking lens 100 forms a clear image of the object in front of the predetermined focus surface, while, conversely, they move towards each other during the so-called rear focus condition in which the phototaking lens 100 forms a clear image of the object in the back of the predetermined focus surface. The object images on the image sensor arrays, row A and row B, relatively coincide with each other during the so-called in-focus condition in which a clear image of the object is formed on the predetermined focus surface. Therefore, the focus adjustment of the phototaking lens 100, in particular, and the amount and the direction of the deviation from the in-focus condition (hereafter simply defocus amount) in the present invention can be determined by obtaining the relative position shift of the pair of object images as a result of converting the pair of object images into electric signals through photo-electric conversion using the image sensor arrays, row A and row B, and by performing algorithm processing on these signals.

Thus, projected images from the re-imaging lenses 501 and 502 in the image sensor arrays, row A and row B, coincide with each other in the vicinity of the predetermined focus surface, which, in general, is the central region corresponding to a focus detection region 60 in the phototaking field 70 as shown in FIG. 15.

Next, the algorithm processing method to obtain the defocus amount will be described.

Each of the image sensor arrays, row A and row B, is formed of a plurality of photo-electric conversion elements and outputs a plurality of output signal strings a[1], ..., a[n] and b[1], ..., b[n] (see FIG. 13(a), 13(b)). The image sensor arrays perform the correlation algorithm while relatively shifting the data within a specified range of the pair of output signal strings by a predetermined data amount L. Letting the maximum shift amount be lmax, the range of L becomes −lmax to lmax. Specifically, the correlation amount C[L] is computed using formula (1).

$$C[L]=\Sigma |a[i+L]-b[i]| \quad (1)$$

$$L=-lmax, \ldots, -2,-1,0,1,2, \ldots, lmax$$

where Σ denotes the total sum over i=k−r.

In formula (1), L is an integer corresponding to the shift amount of the data strings as described above. The first term k and the last term r vary depending on the shift amount L as described formulae (2) or (2)'. If L≥0, $$k=k0+INT\{-L/2\} \quad (2)$$

$$r=r0+INT\{-L/2\}$$

If L<0, $$k=k0+INT\{-(L+1)/2\} \quad (2)'$$

$$r=r0+INT\{-(L+1)/2\},$$

where k0 and r0 denote the first term and the last term, respectively, when the shift amount L is equal to 0.

FIG. 14(a)–14(e) show combinations of signals to compute the absolute value of the difference between row A signals and row B signals in formula (1) and the algorithm range of adding the absolute values of these differences when the initial term k and the last term r are varied by formulae (2) and (2)'. As shown in FIGS. 14(a)–14(e), the ranges used in the correlation algorithm of row A and row B shift away from each other with the change in the shift amount L. A method is known in which the first term k and the last term r are fixed regardless of the shift amount L. In that case, the range used in the correlation algorithm of one of the rows is held constant and only the other row shifts. In that case, the shift amount of the relative position becomes the shift amount L when a pair of data coincide; hence the shift amount making the correlation amount a relative minimum among the correlation amounts C[L] thus obtained is detected. This shift amount is multiplied by a constant determined by the pitch width of the photo-electric conversion elements in the image sensor array and the optical system shown in FIG. 11 to become the defocus amount. Thus, a large defocus amount can be detected by making the maximum shift value lmax larger.

Here, the correlation amount C[L] is discrete, as described in FIG. 13(c), and the minimum unit of detectable defocus amount is limited by the pitch width of the photo-electric conversion elements in the image sensor arrays, row A and row B. A method in which precise focus detection is obtained by performing the interpolation algorithm based on the discrete correlation amount C[L] resulting in a new, true relative minimum Cex is disclosed by the applicant of the present invention in Japanese Unexamined Patent Publication Sho 60-37513 (U.S. Pat. No. 4,561,749). In this method, a true relative minimum Cex and a shift amount Ls producing Cex are computed by formulae (3) and formula (4) using a relative minimum correlation amount C[l] and correlation amounts C[l+1] and C[l−1] with shift amounts on both sides of C[l], as shown in FIG. 12.

$$DL=(C[l-1]-C[l+1])/2 \quad (3)$$

$$Cex=C[l]-|DL|$$

$$E=MAX\{C[l+1]-C[l], C[l-1]-C[l]\}$$

$$Ls=l+DL/E \quad (4)$$

In formulae (3), MAX{Ca, Cb} is the larger of Ca and Cb. Finally, the defocus amount DF is computed from said shift amount Ls using formula (5).

$$DF=Kf \times Ls \quad (5)$$

Kf in formula (5) is a constant determined by the photo-electric conversion elements in the optical system and in the image sensor array in FIG. 11.

The defocus amount thus obtained needs to be further determined regarding whether it is a true defocus amount or whether it is caused by a fluctuation of correlation amounts due to noise and the like. If the defocus amount satisfies the conditions of formula (6), it is considered reliable.

$$E > E1 \text{ and } Cex/E < G1. \quad (6)$$

E1 and G1 in formula (6) are predetermined threshold values. Value E describes changes in the correlation amount which depend on the contrast of the object, and, as the value of E becomes larger, the contrast becomes larger and the confidence level becomes higher. Cex is the difference of the pair of data when the data are closest to each other; ideally, it should be 0. However, due to noise and the visual difference between region 101 and region 102, there is a minute difference between the pair of object images; hence Cex is never 0 in reality. As the contrast of the object becomes higher, the effect of noise and the difference in object images becomes smaller; hence Cex/E is used to denote the level of coincidence of the pair of data. Naturally, as the value of Cex/E becomes closer to 0, the level of the coincidence of the pair of data and the level of confidence become higher. There is another method in which the contrast for one of the pair of data is computed and used instead of the value E to determine confidence. If the system is determined reliable, driving or display of the phototaking lens 100 is executed based on the defocus amount DF. The correlation algorithm, the interpolation algorithm, and the determination of conditions associated with formula (1) through formula (6), above, will be referred to together as the focus detection algorithm.

In the explanation described above, the output signal strings of the image sensor arrays, row A and row B, a[1], ..., a[n] and b[1], ..., b[n], are used directly. However, sometimes correct focus detection is impossible due to the effects of frequency components of the object higher than the Nyquist frequency or due to the effects of unbalance in the output of row A and row B. Therefore, a method in which the filter algorithm process is performed on the output signal strings and the focus detection algorithm is performed using the resulting filter process data is disclosed by the applicant of the present invention in Japanese Unexamined Patent Publication Sho 61-245123. For example, to eliminate high frequency components higher than the Nyquist frequency, the filter processing algorithm of formulae (7) is executed resulting in the filter processing data Pa[1], ..., Pa[n−2] and Pb[1], ..., Pb[n−2] from the output signal strings a[1], ..., a[n] and b[1], ..., b[n] of row A and row B.

$$Pa[i] = (a[i] + 2 \times a[i+1] + a[i+2])/4 \quad (7)$$

$$Pb[i] = (b[i] + 2 \times b[i+1] + b[i+2])/4,$$

where i=1 to n−2.

Next, by performing the filter processing algorithm using formulae (8) to eliminate the effects of the unbalanced output from row A and row B, for example, on the filter processing data Pa[1], ..., Pa[n−2] and Pb[1], ..., Pb[n−2], the filter processing data Fa[1], ..., Fa[n−2] and Fb[1], ..., Fb[n−2] are obtained.

$$Fa[i] = -Pa[i] + 2 \times Pa[i+s] - Pa[i+2s] \quad (8)$$

$$Fb[i] = -Pb[i] + 2 \times Pb[i+s] - Pb[i+2s],$$

where i=1 to n−2−2s.

In formulae (8), s represents integers from 1 to about 10, and as s becomes larger, the frequency component of the object pattern computed becomes lower, s becomes smaller, and the frequency of the object pattern computed becomes higher. Moreover, as s becomes larger, the number of data being filter processed becomes smaller.

In the near in-focus condition, the object image contains more of the high frequency components and a relatively smaller value of s is preferred, whereas in the out-of-focus condition, the object image is blurred and only the low frequency components remain; thus the larger value of s is preferred. If s is small, almost all the low frequency components are eliminated; hence, in the case of the absence of high frequency components due to a large defocus amount, detection becomes impossible. Therefore, making the maximum shift number lmax in formula (1) in this case becomes meaningless; thus a relatively smaller value of s is preferred. On the other hand, if s is large, because the low frequency components are being computed and detection is possible even if the defocus amount is large, a relatively large value is set for lmax.

Hereinafter, when the frequency component of the object pattern is discussed, it is assumed that the spatial frequency in the predetermined focus surface is referred to rather than the image formed on the image sensor array. Therefore, the frequency related to filter processing data obtained by the filter processing algorithm of formula (8) is related to the magnification of the image formed by the re-imaging lenses 501 and 502 on the image sensor arrays, row A and row B, and the pitch width of the photo-electric conversion elements composing the image sensor arrays, row A and row B, in addition to the value of s. In general, the re-imaging lenses are structured in such a manner that the image on the predetermined focus surface of the phototaking lens is reduced on the image sensor arrays; hence said magnification is called the minimum magnification, and it is assumed that, as the minimum magnification becomes larger, the image on the predetermined focus surface formed on the image sensor array becomes more reduced. Moreover, the filter processing data obtained by the filter processing algorithm in formulae (8) contains more of the low frequency information as the value of s increases, the reduction ratio increases, and the pitch width of the photo-electric conversion increases, while it contains high frequency information as the value of s decreases, the reduction ratio decreases, and the pitch width of the photo-electric conversion decreases.

Furthermore, when the value of s is relatively large, sometimes the number of data is reduced by half by using every other datum from the filter processing data Fa[i] and Fb[i]. In this case, since one datum contains the width of two pixels, half of the algorithm range is required, compared to the case in which all the data are used. Moreover, the shift amount L in the case when every other datum is used is equivalent to the shift amount 2 in the case when every datum is used, enabling detection of the same defocus amount even with reduction of the maximum shift number by half.

FIGS. 6(a)–6(c) show an example for an object having only low frequency components with (a) representing the output signal string, (b) the filter processing data with s=2 and, (c) the filter processing data with s=8. Since an in-focus condition is assumed, the output signal string of row A coincides with that of row B. Thus, the filter processing data with s=2 are flat with hardly any contrast, and, by making s=8, the contrast becomes sufficient, resulting in a defocus amount with a high level of confidence.

FIGS. 7(a)–7(c) show an example for an object having only high frequency components with the same type of data as in FIGS. 6(a)–6(c). Also, an in-focus condition is assumed. In this case, the contrast is sufficient with s=2, resulting in a defocus amount with a high level of confidence.

FIGS. 8(a)-8(c) show an example for an object having a sufficient amount of both high frequency components and low frequency components with the same type of data as in FIGS. 6(a)-6(c). Also, an in-focus condition is assumed. This is a pattern seen only in the case in which the boundary between the white part and the black part of the object is located within the focus detection region described in FIGS. 13(a)-13(c). In this pattern, sufficient contrast is obtained regardless of the value of s.

The frequency components contained in the object image differ by object; hence, filter processing is performed to compute the high frequency information by setting s=2 initially, and the focus detection algorithm of formula (1) through formulae (6) is executed using the filter processing data obtained. If a defocus amount with a high level of confidence is obtained, the algorithm is completed, otherwise filter processing is performed to compute the low frequency information by setting s=4, and the focus detection algorithm of formula (1) through formulae (6) is executed using the filter processing data obtained. In this method the value of s is increased until a defocus amount with a high level of confidence is obtained in this manner. In this method, because the high frequency information is computed initially, a defocus amount with a high level of confidence is obtained in the vicinity of the normal in-focus position of the object at this point. If the object contains only the low frequency components, as in the case of a human face, filter processing to compute the low frequency information is performed and the defocus amount is obtained by the focus detection algorithm based on the resulting filter processing data. If the defocus amount computed is too large, filter processing to compute the low frequency information is performed, and a new defocus amount is obtained by executing the focus detection algorithm with a larger maximum shift number lmax based on the resulting filter processing data. Thus, in the vicinity of the in-focus condition, the algorithm time is short and even a moving object complies easily, and objects containing only low frequency components can be focused, enabling detection of a large defocus amount.

In the focus detection device described above, the image sensor arrays, row A and row B, are placed in only one direction; hence, assuming that the image sensor arrays are placed in the horizontal direction with respect to the phototaking field, for example, focus detection for a object containing contrast only in the vertical direction with respect to the phototaking field is impossible. There exists a focus detection device to solve such problems by placing the image sensor arrays in both the vertical and the horizontal directions. Hereinafter such a focus detection device is described with reference to FIGS. 9(a)-9(b).

As shown in FIG. 9(a), a field mask 20, a field lens 30, a diaphragm 40, a re-imaging lens 50, and image sensor arrays A, B, C, D are placed on the optical axis of a phototaking lens 100. The image sensor arrays A and B are placed in the horizontal direction of the phototaking field, while the image sensor arrays C and D are placed in the vertical direction of the phototaking field. The field mask 20 containing a cross shaped aperture unit is placed in the vicinity of the predetermined focus surface of the phototaking lens 100 and regulates the image of the object formed by the phototaking lens 100. The diaphragm 40 contains four aperture stop units 41, 42, 43, and 44 which are projected on the phototaking lens as units 11, 12, 13, and 14 by the field lens 30. The re-imaging lens 50 comprises four lenses 51, 52, 53, and 54 corresponding to the four aperture units 41, 42, 43, and 44 of the diaphragm 40, as shown in FIG. 9(b), and forms the image of the field mask 20 on the image sensor 2. Thus, light rays entering from region 11 of the phototaking lens 100 pass through the field mask 20, the field lens 30, the aperture unit 41 of the diaphragm 40, and the re-imaging lens 51 and form an image on the image sensor array A. Similarly, light rays entering from each of areas 12, 13, and 14 of the phototaking lens 100 form an image on the image sensor arrays B, C, and D, respectively. The object image formed on the image sensor arrays A and B move away from each other if the phototaking lens 100 is in the front focus condition, move towards each other in the rear focus condition, and line up with a certain interval in the in-focus condition. Thus, the defocus amount in the horizontal direction of the phototaking lens 100 is computed by executing algorithm processing on the output strings a[i] and b[i] of the image sensor arrays, row A and row B, as described before. Similarly, the object images formed on the image sensor arrays C and D move away from each other if the phototaking lens 100 is in the front focus condition, move towards each other in the rear focus condition, and line up with a certain interval in the in-focus condition. Thus, the defocus amount in the vertical direction of the phototaking lens 100 is computed by executing algorithm processing on the output strings c[i] and d[i] of the image sensor arrays, row C and row D, as described before. Using such an optical system and an image sensor results in the crossing of the horizontal and the vertical focus detection areas 81 in the shooting field 80 as shown in FIG. 10(a).

There is also a focus detection device capable of obtaining defocus amounts at several locations in the phototaking field by having several sets of optical systems shown in FIG. 11 or FIG. 9, in which case the focus detection areas 91 are divided in the phototaking field 90 as shown, for example, in FIG. 10(b).

In a focus detection device wherein a plurality of defocus amounts is obtained, the final defocus amount is determined from the plurality of defocus amounts, and driving or display of the phototaking lens is executed based on the final defocus amount. Methods to choose one final defocus amount from among a plurality of defocus amounts are disclosed in Japanese Unexamined Patent Publication Sho 60-262004, Japanese Unexamined Patent Publication Hei 2-178641 (U.S. Pat. No. 5,258,801), Japanese Unexamined Patent Publication Hei 4-235512. Methods in which the average of a plurality of defocus amounts, the defocus amount showing the closest distance, or the defocus amount with the largest E-value described above is used are disclosed in Japanese Unexamined Patent Publication Sho 60-262004. A method in which a plurality of defocus amounts is grouped into subgroups with close values, several defocus amounts are obtained by averaging the defocus amounts in these subgroups, and the defocus amount showing the closest distance is selected as the final defocus amount, for example, among these average defocus amounts is disclosed in Japanese Unexamined Patent Publication Hei 2-178641 (U.S. Pat. No. 5,258,801) and Japanese Unexamined Patent Publication 4-235512.

In the systems described above, the result of the focus detection algorithm for an object consisting only of low frequency information, in general, has a lower level of accuracy than the algorithm result containing high frequency information, even if the value of s in formulae (8) is set to the optimal value according to the object pattern. Moreover, if the value of s is relatively large and the number of data is reduced by half in filter processing to compute the low frequency information by using every other datum of the filter processing data Fa[i] and Fb[i], one datum has the width equivalent of two pixels, which causes a decrease in the accuracy of the interpolation algorithm of formulae (3) and formula (4), and the drop in accuracy of focus detection becomes more noticeable.

In the focus detection device in which focus detection is executed at a plurality of locations in the phototaking field, a plurality of filter processing data are computed by performing filter processing for output signals from the image sensors of each of the focus detection areas using formulae (7) and formulae (8).

However, sometimes filter processing data related to only low frequency components obtained by the filter processing of formulae (8) with a large value of s are included in the plurality of filter processing data computed. For example, suppose the focus detection algorithm is performed using formulae (1) through (6) based on such filter processing data and a defocus amount with the closest distance is obtained, and the defocus amount with the closest distance is selected as the final defocus amount in the focus detection device in which the defocus amount with the closest distance is used as the final defocus amount. In this case, the defocus amount with the closest distance selected as the final defocus amount is computed, to begin with, based on the filter processing data related only to the low frequency components; hence the accuracy of the result of focus detection is poor, as described above.

In other words, the focus detection device in which focus detection is performed at a plurality of locations in the phototaking field has the problem that the level of confidence of accuracy of the result of focus detection is low because sometimes the defocus amount obtained based on filter processing data related only to low frequency components is determined to be the final defocus amount, in spite of the existence of filter processing data related to high frequency components that would result in highly accurate focus detection, causing a drop in the accuracy of focus detection.

SUMMARY OF THE INVENTION

The object of the present invention is to provide a focus detection device with an improved level of confidence in the results of focus detection by selecting a defocus amount with highly accurate focus detection among a plurality of defocus amounts as the final defocus amount.

In order to achieve the above object, the present invention provides a focus detection device having a plurality of focus detection areas within the phototaking field established in the predetermined focus surface of the phototaking lens, a focus detection optical system to form an object image on a plurality photo-electric conversion devices corresponding to the focus detection areas by guiding the light from the object that passes through said phototaking lens to each of said photoelectric conversion devices; an object image detection circuit including the plurality of photo-electric conversion devices which are provided corresponding to each of said focus detection areas and which output signals corresponding to the light intensity distribution of the object image; a filter processing circuit to convert the output signals of each of said photo-electric conversion devices to filter processing data corresponding to a particular frequencies; a focus detection algorithm circuit to compute the focus adjustment condition of said phototaking lens based on the filter processing data computed by the filter processing circuit; and a focus condition determination device to determine the final focus adjustment conditions of said phototaking lens based on the filter processing data computed by the filter processing circuit for each of said focus detection areas and based on the focus adjustment condition computed by the focus detection algorithm circuit for each of said focus detection areas.

The focus detection device of the present invention is made to determine, by said final focus determination device, the final focus adjustment condition by preferring the focus adjustment condition computed based on high frequency components.

The focus detection device according to the present invention is made, by said filter processing device, to compute the focus adjustment condition by the focus detection algorithm circuit related to high frequencies, and, if necessary, to repeat the computation of the focus adjustment condition by the focus detection algorithm circuit related to lower frequencies until a predetermined confidence level is obtained for the results of the computation. In this manner, once the predetermined level of confidence is obtained in the result of the focus adjustment computation related to the high frequency component, computation of the focus adjustment condition related to lower frequency components can be omitted, reducing the burden of the focus detection algorithm circuit and shortening the focus detection time.

BRIEF DESCRIPTION OF THE DRAWINGS

The invention will be described in conjunction with the following drawings wherein.

DETAILED DESCRIPTION OF PREFERRED EMBODIMENTS

Figure 1:
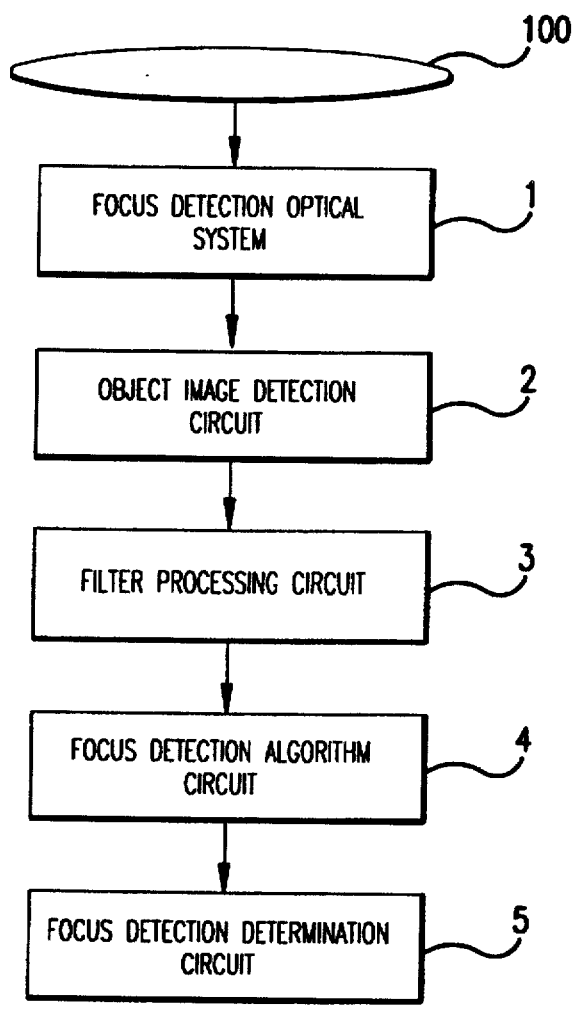
FIG. 1 is a block diagram of the main structural elements of an embodiment of the present invention.

FIG. 1 is a block structural diagram of an embodiment of the present invention.

Figure 9A:
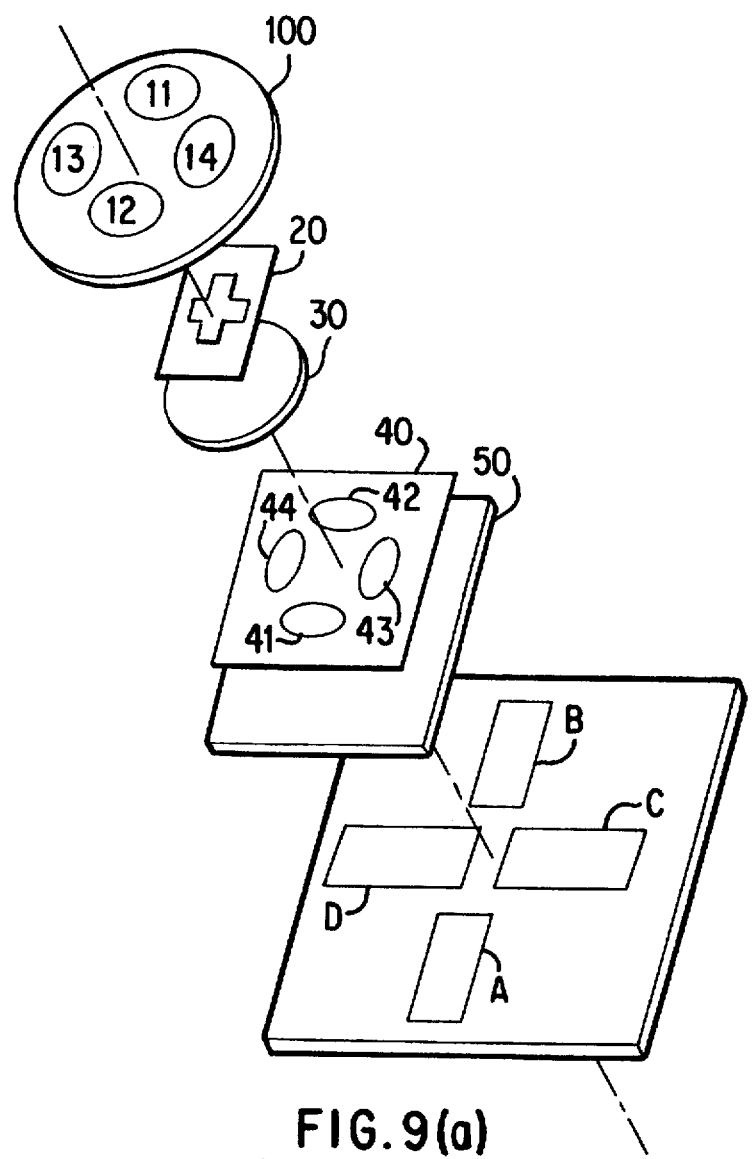
FIGS. 9(a)–9(b) are drawings showing a related art focus detection optical system of a focus detection device to execute focus detection for the horizontal direction and the vertical direction and a front view of a re-imaging lens of the focus detection optical system respectively.
Figure 9B:
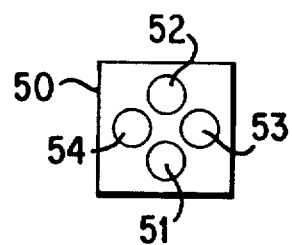

The focus detection optical system 1 is an optical system to guide light from the object passing through the phototaking lens 100 to the object image detection circuit 2 and comprises, for example, a field mask 20, a field lens 30, aperture stop units 41, 42, 43, and 44, and re-imaging lenses 51, 52, 53, and 54, as described in FIG. 9. The aperture stop units 41 and 42 and the re-imaging lenses 51 and 52 are used for focus detection in the horizontal direction with respect to the phototaking field, while the aperture stop units 43 and 44 and the re-imaging lenses 53 and 54 are used for focus detection in the vertical direction with respect to the phototaking field. Here, the reduction rate in the horizontal direction by the re-imaging lenses 51 and 52 and the reduction rate in the vertical direction by the re-imaging lenses 53 and 54 are assumed to be equal.

A object image detection circuit 2 is a circuit four rows of image sensor arrays A, B, C, and D, photo-electric conversion devices as shown in FIG. 9; each image sensor array, in turn, consists of n photo-electric conversion elements. Therefore, row A, row B, row C, and row D output signal strings a[i], b[i], c[i], and d[i], respectively, each consisting of n data. Here, the image sensor arrays A and B compose a pair of image sensors, while the image sensor arrays C and D compose another pair of image sensors. The image sensor arrays A and B are placed in the horizontal direction with respect to the phototaking field, while the image sensor arrays C and D are placed in the vertical direction with respect to the phototaking field. In the present embodiment, the pitch width of the photo-electric conversion elements which compose the image sensor arrays A, B, C, and D are made to equal each other; hence the pitch width of the photo-electric conversion elements in the horizontal direction is the same as that of the photo-electric conversion elements in the vertical direction.

A filter processing circuit 3 is a circuit to execute the filter processing described in formulae (7) and (8) on the output signal strings a[i], b[i], c[i], and d[i] outputted from the object image detection circuit 2 and to output the filter processing data Fa[i], Fb[i], Fc[i], and Fd[i]. Since the pitch width of the photo-electric conversion elements and the reduction rate in the horizontal direction and the vertical direction are equal to each other, the relative highs and lows of the frequency components related to the filter processing data from the filter processing algorithm in the horizontal and the vertical directions depend on the value of s in formulae (8), and several types of filter processing algorithms are realized by changing the value of s.

A focus detection algorithm circuit 4 executes the focus detection algorithms of formulae (1) through (6) using the filter processing data Fa[i] and Fb[i] outputted from the filter processing circuit 3 and computes the defocus amount DfH in the horizontal direction with respect to the phototaking field of the phototaking lens 100. Similarly, it executes the focus detection algorithms of formulae (1) through (6) using the filter processing data Fc[i] and Fd[i] and computes the defocus amount DfV in the vertical direction with respect to the phototaking field of the phototaking lens 100.

A focus detection determination circuit 5 determines the final defocus amount DfL based on the horizontal defocus amount DfH and the vertical defocus amount DfV computed by the focus detection algorithm circuit 4 and the type of filter processing algorithm used to compute DfH and DfV.

Here, the filter processing circuit 3, the focus detection algorithm circuit 4, and the focus detection determination circuit 5 can be realized by a controller implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 1–5 can be used as the controller. A distributed processing architecture is preferred for maximum data/signal processing capability and speed.

Hereinafter, the overall operation of a focus detection device of the present invention structured above will de described in reference to FIG. 2.

In step S1, the horizontal defocus amount DfH is obtained by algorithm processing the output signal strings a[i] and b[i] outputted from the object image detection circuit 2 using the filter processing circuit 3 and the focus detection algorithm circuit 4. Details of the algorithm are omitted because such algorithms are known. Next, at step S2, the vertical defocus amount DfV is obtained by algorithm processing the output signal strings c[i] and d[i] outputted from the object image detection circuit 2 using the filter processing circuit 3 and the focus detection algorithm circuit 4. Details of the algorithm are also omitted because such algorithms are known. At step S3, the focus detection signal determination circuit 5 determines the final defocus amount DfL based on the horizontal defocus amount DfH, the vertical defocus amount DfV, and the type of filter processing algorithm used to compute DfH and DfV. The details of step S3 will be described later.

Figure 2:
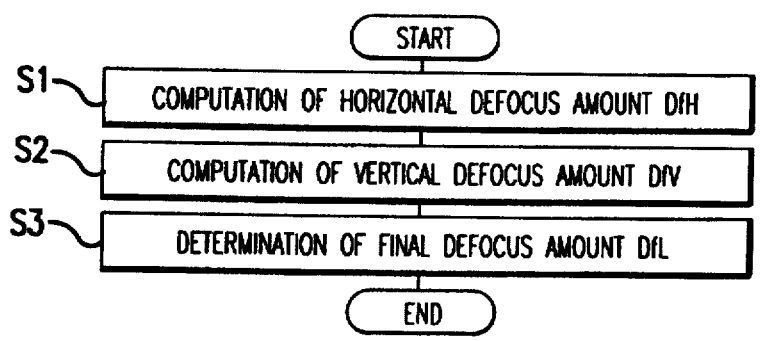
FIG. 2 is a flow chart describing the operation of the embodiment of FIG. 1.

Here, the horizontal defocus amount DfH is computed before the vertical defocus amount DfV in the operation described in FIG. 2, but the order can be reversed since there is no special meaning in the order of computation.

Figure 3:
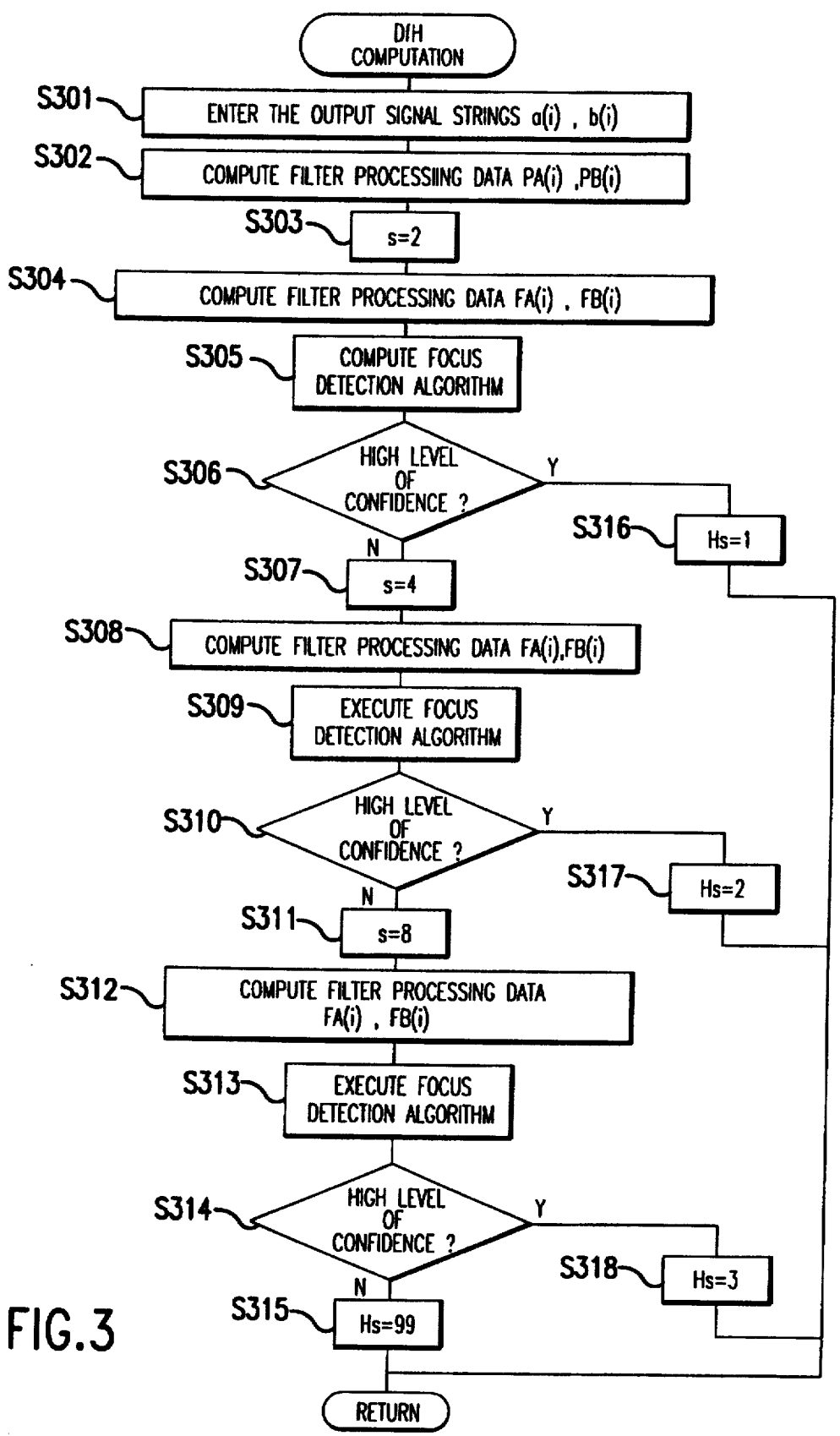
FIG. 3 is a flow chart of the computation operation of the horizontal defocus amount DfH of the embodiment of FIG. 1.

Next, the computation operation of the horizontal defocus amount DfH at step S1 in FIG. 2 will be described in reference to FIG. 3.

At step S301, the output signal strings a[i] and b[i] are entered and the filter processing data Pa[i] and Pb[i] are computed using formulae (7) at the next step S302. After setting the value of s in formulae (8) to 2 at step S303, the program moves to step S304 and computes the filter processing data Fa[i] and Fb[i] related to a high frequency component by executing the filter processing algorithm of formulae (8) at step S303. At step S305, the focus detection algorithm of formulae (1) through (6) is executed using the filter processing data Fa[i] and Fb[i] computed. At step S306, the program determines whether or not a defocus amount with a high level of confidence is obtained, and if a defocus amount with a high level of confidence is obtained, the program moves to step S316, otherwise it moves to step S307. At step S307, the value of s in formulae (8) is set to 4, then the program moves to step S308 where the filter processing algorithm of formulae (8) is executed and the filter processing data Fa[i] and Fb[i] related to a medium frequency component are computed. At step S309, the focus detection algorithm of formulae (1) through (6) is executed using the filter processing data Fa[i] and Fb[i] computed.

At step S310, the program determines whether or not a defocus amount with a high level of confidence is obtained, and if a defocus amount with a high level of confidence is obtained, the program moves to step S317, otherwise it moves to step S311. At step S311, the value of s in formulae (8) is set to 8, then the program moves to step S312 where the filter processing algorithm of formulae (8) is executed and the filter processing data Fa[i] and Fb[i] related to a low frequency component are computed. At step S313, the focus detection algorithm of formulae (1) through (6) is executed using the filter processing data Fa[i] and Fb[i] computed. Then at step S314, the program determines whether or not a defocus amount with a high level of confidence is obtained, and if a defocus amount with a high level of confidence is obtained, the program moves to step S318, otherwise it moves to step S315. At step S315, the process ends by setting the value of Hs to 99. The value of Hs indicates the type of filter processing algorithm at the time when a defocus amount with a high confidence level is obtained, and if 99 is set for Hs, it indicates that a horizontal defocus amount DfH is not obtained.

On the other hand, at step S316, the process is completed by assigning 1 to Hs. The value 1 of Hs indicates that a horizontal defocus amount DfH is obtained based on the filter process data related to a high frequency component. Moreover, at step S317, the process is completed by assigning 2 to Hs. The value 2 of Hs indicates that the defocus amount DfH is obtained based on the filter process data related to a medium frequency component. Moreover, at step S318, the process is completed by assigning 3 to Hs. The value 3 of Hs indicates that a horizontal defocus amount DfH is obtained based on the filter process data related to a low frequency component.

In the computation operation of the horizontal defocus amount DfH described above, steps S301 through S304, S307, S308, S311, and S312 are operations of the filter process circuit 3, and the other steps are operations of the focus detection algorithm circuit 4.

Figure 4:
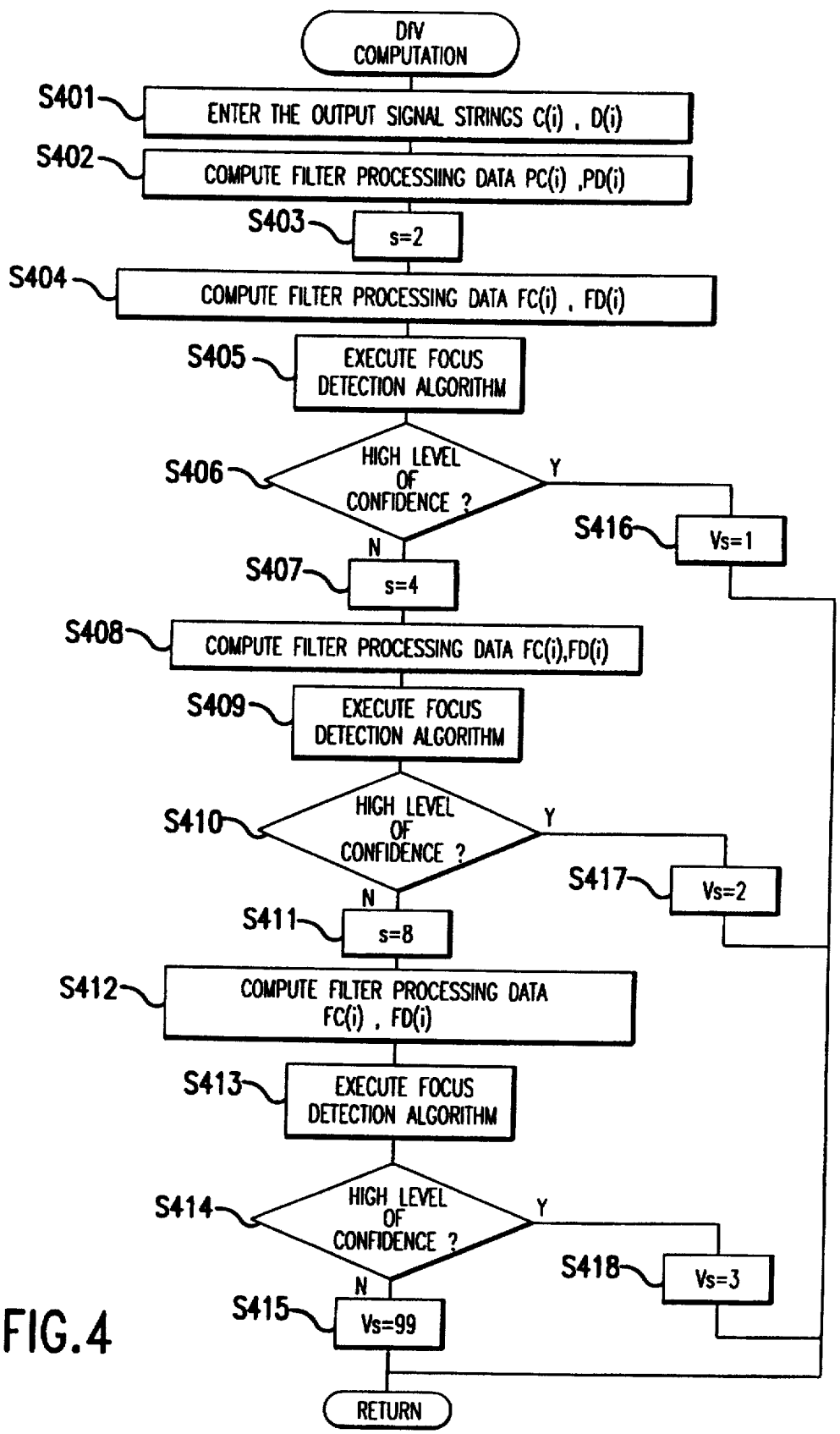
FIG. 4 is a flow chart of the computation operation of the vertical defocus amount DfV of the embodiment of FIG. 1.

Next, the computation operation of the vertical defocus amount DfV at step S2 in FIG. 2 will be described in detail in reference to FIG. 4.

At step S401, the output signal strings c[i] and d[i] are entered and the filter processing data Pc[i] and Pd[i] are computed using formulae (7) with c[i] and d[i] in place of a[i] and d[i] at the next step S402. After setting the value of s in formulae (8) to 2 at step S403, the program moves to step S404 and computes the filter processing data Fc[i] and Fd[i] related to a high frequency component by executing the filter processing algorithm using Pc[i] and Pd[i] in place of Pa[i] and Pb[i] in formulae (8). At step S405, the focus detection algorithm of formulae (1) through (6) is executed using the filter processing data Fc[i] and Fd[i] computed.

At step S406, the program determines whether or not a defocus amount with a high level of confidence is obtained, and if a defocus amount with a high level of confidence is obtained, the program moves to step S416, otherwise it moves to step S407. At step S407, the value of s in formulae (8) is set to 4, then the program moves to step S408 where the filter processing algorithm of formulae (8) is executed using Pc[i] and Pd[i] in place of Pa[i] and Pb[i], and the filter processing data Fc[i] and Fd[i] containing a medium frequency component are computed. At step S409, the focus detection algorithm of formulae (1) through (6) is executed using the filter processing data Fc[i] and Fd[i] computed. At step S410, the program determines whether or not a defocus amount with a high level of confidence is obtained, and if a defocus amount with a high level of confidence is obtained, the program moves to step S417, otherwise it moves to step S411. At step S411, the value of s in formulae (8) is set to 8, then the program moves to step S412 where the filter processing algorithm of formulae (8) is executed using Pc[i] and Pd[i] in place of Pa[i] and Pb[i], and the filter processing data Fc[i] and Fd[i] related to a low frequency component are computed. At step S413, the focus detection algorithm of formulae (1) through (6) is executed using the filter processing data Fc[i] and Fd[i] computed.

Then, at step S414, the program determines whether or not a defocus amount with a high level of confidence is obtained, and if a defocus amount with a high level of confidence is obtained, the program moves to step S418, otherwise it moves to step S415. At step S415 the process ends by setting the value of Vs to 99. The value of Vs indicates the type of filter processing algorithm at the time when a defocus amount with a high confidence level is obtained, and if 99 is set for Vs, it indicates that a vertical defocus amount DfV is not obtained.

On the other hand, at step S416, the process is completed by assigning 1 to Vs. The value 1 of Vs indicates that a vertical defocus amount DfV is obtained based on the filter process data related to a high frequency component. Moreover, at step S417, the process is completed by assigning 2 to Vs. The value 2 of Vs indicates that a vertical defocus amount DfV is obtained based on the filter process data related to a medium frequency component. Moreover, at step S418, the process is completed by assigning 3 to Vs. The value 3 of Vs indicates that a vertical defocus amount DfV is obtained based on the filter process data related to a low frequency component.

In the computation operation of a vertical defocus amount DfV described above, steps S401 through S404, S407, S408, S411, and S412 are operations of the filter process circuit 3, and the other steps are operations of the focus detection algorithm.

Figure 5:
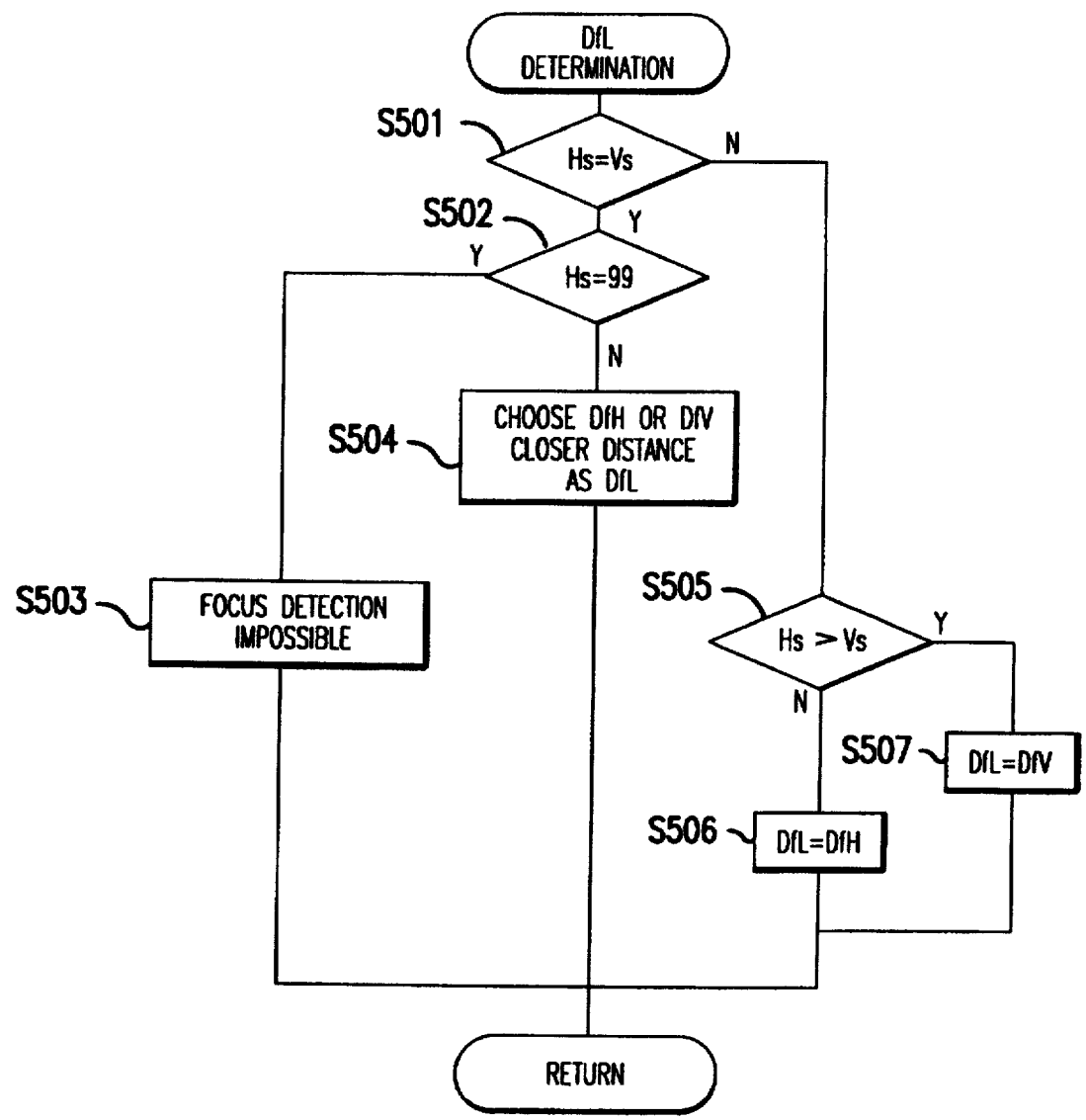
FIG. 5 is a flow chart of the determination operation of the final defocus amount DfL in the embodiment of FIG. 1.
Figure 6A:
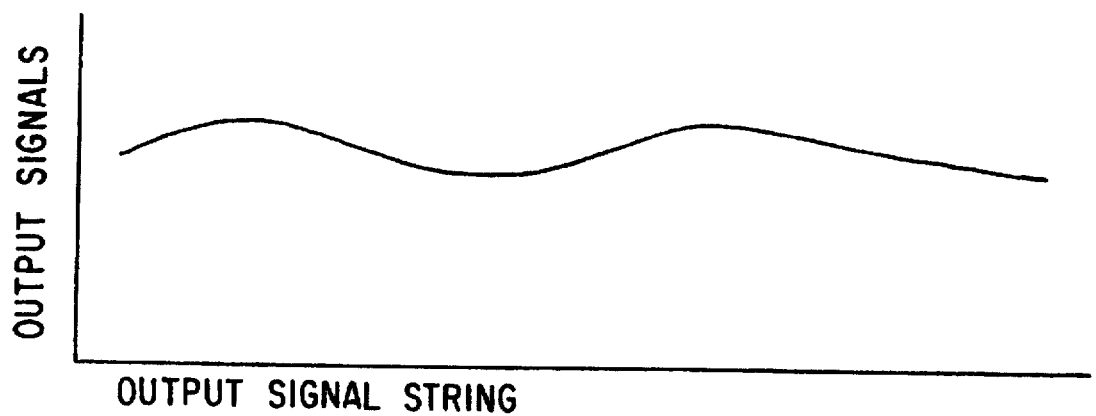
FIGS. 6(a)–6(c) are graphs of an example of output signals and processing data signals of an object pattern consisting of only low frequency components.
Figure 6B:
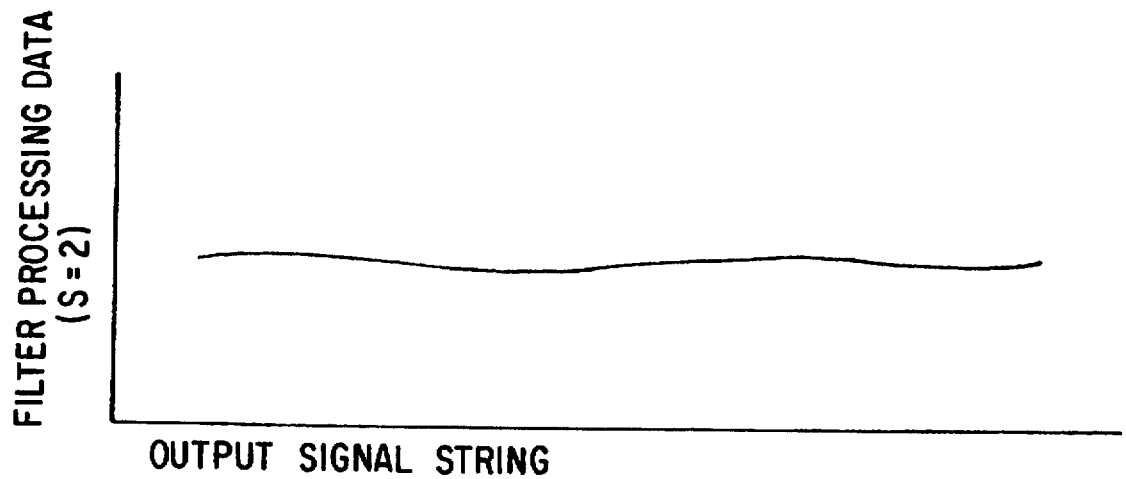
Figure 6C:
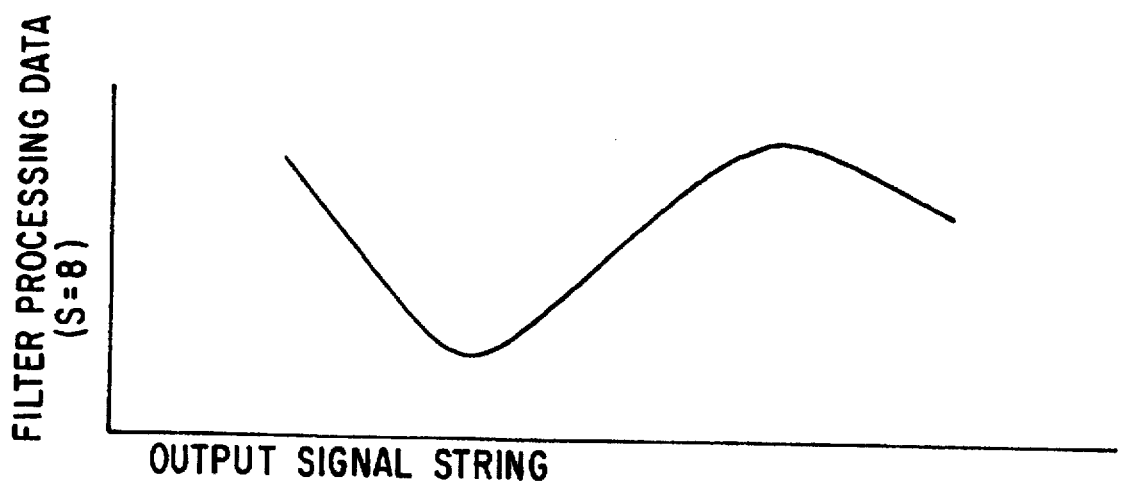
Figure 7A:
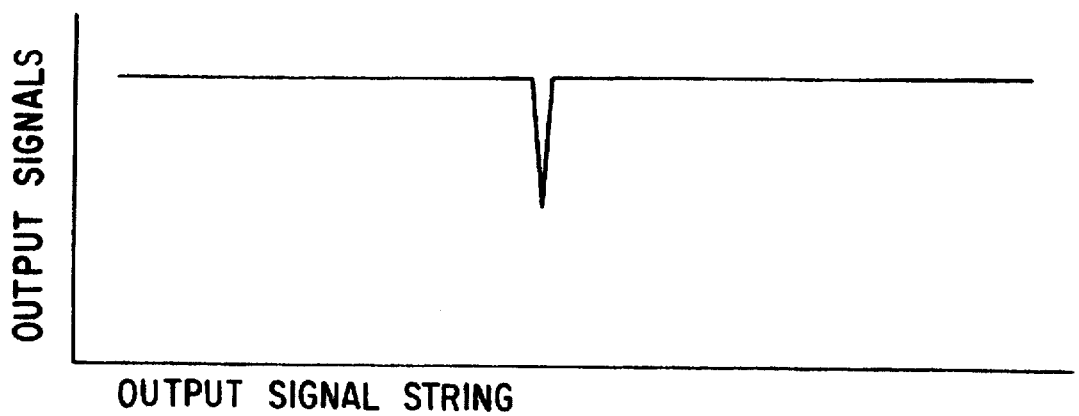
FIGS. 7(a)–7(c) are graphs of an example of output signals and processing data signals of an object pattern consisting of only high frequency components.
Figure 7B:
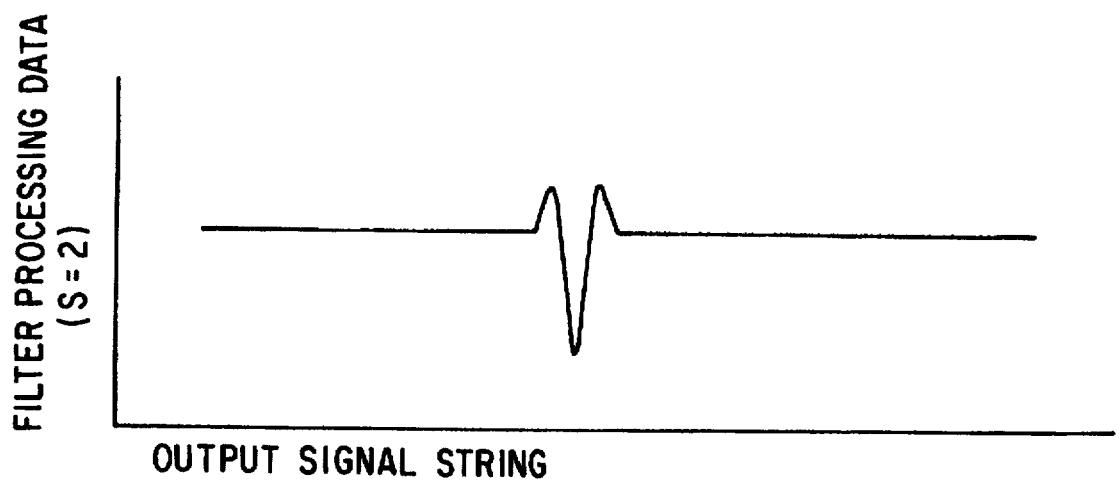
Figure 7C:
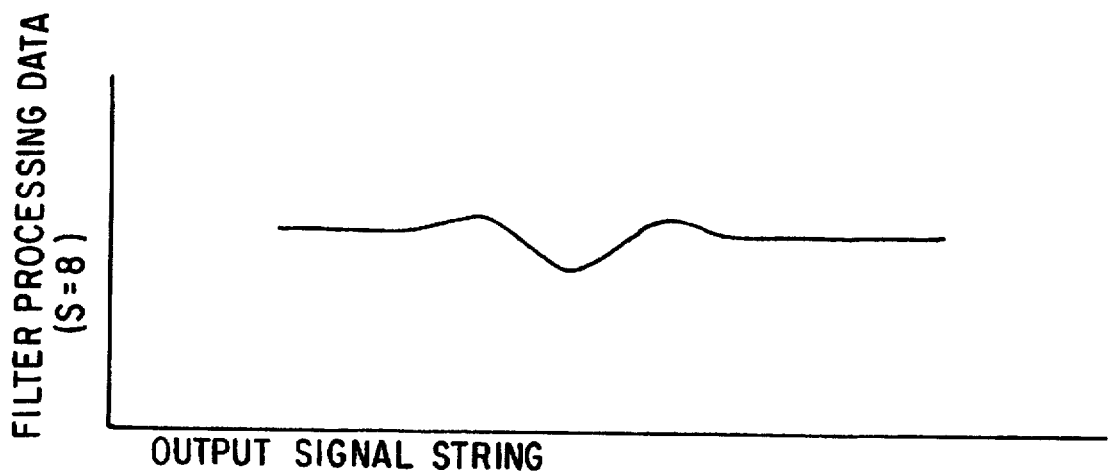
Figure 8A:
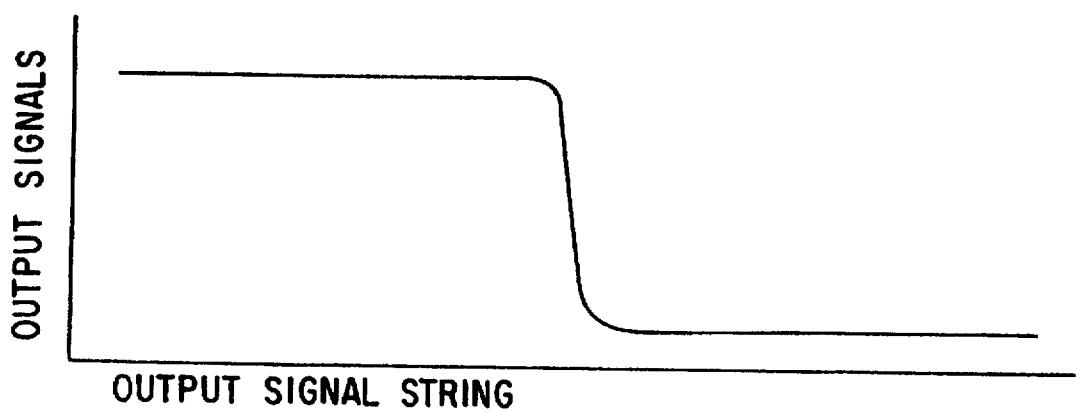
FIGS. 8(a)–8(c) are graphs of an example of output signals and processing data signals of an object pattern consisting of both high frequency components and low frequency components.
Figure 8B:
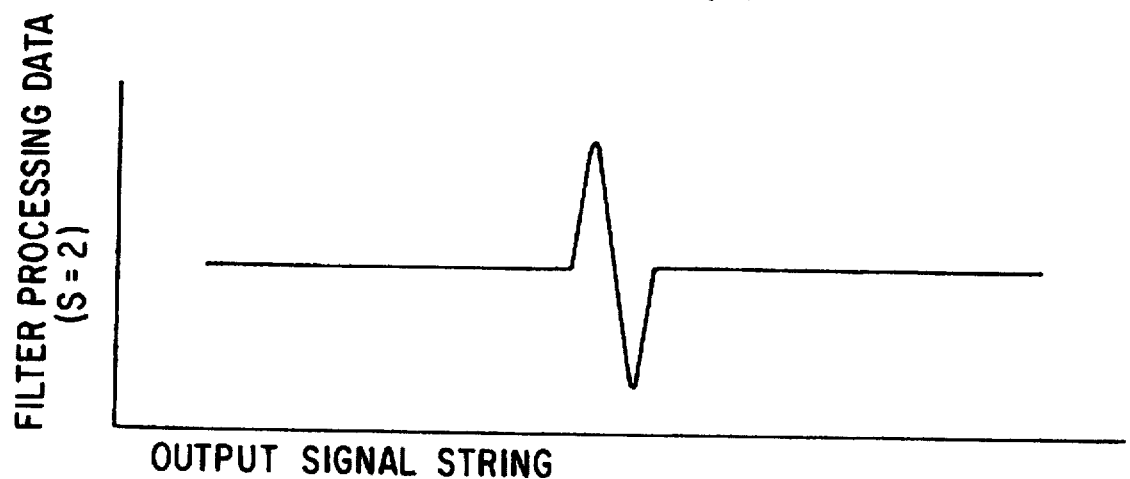
Figure 8C:
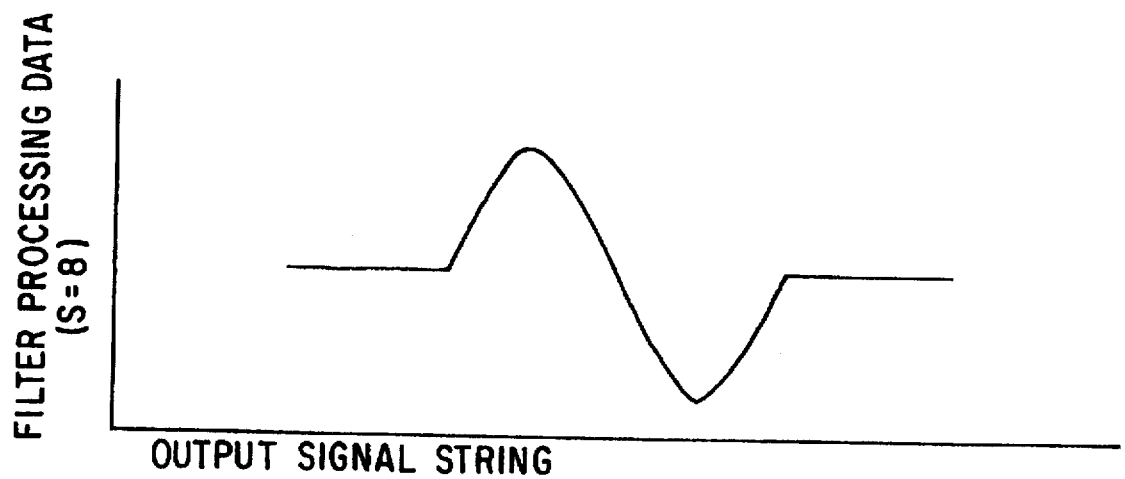

Next, the final defocus amount DfL determination operation of step S3 in FIG. 2 will be described in reference to FIG. 5.

At step S501, Hs, established by computation of the horizontal defocus amount DfH, and Vs, established by computation of the vertical defocus amount DfV, are compared. If both values are equal, the program moves to step S502, otherwise it moves to step S505. At step S502, the program determines whether or not the value of Hs is 99, or whether or not the horizontal defocus amount DfH is obtained. Since Hs and Vs are determined to be equal at step S501, if Hs is 99, then Vs is also 99, which indicates that neither DfH nor DfV are obtained. In this case, the program moves to step S503. If Hs is not 99, then both DfH and DfV are obtained, and the program moves to step S504. At step S503, since neither DfH nor DfV are obtained, the process is completed with indication that focus detection is impossible.

If the program determines that Hs and Vs are equal at step S501 and determines that both DfH and DfV are obtained at step S502, the program advances to step S504. Both Hs and Vs having the same value indicates that both DfH and DfV are obtained by the filter processing data related to the same frequency component. Therefore, a conventional method can be used to determine the final defocus amount, and the process is completed here by choosing from DfH or DfV the one with a closer distance as the final defocus amount DfL.

On the other hand, if the program determines that Hs and Vs are not equal in step S501, it moves to step S505. Since at least one of DfH and DfV are obtained, if both are obtained, then the frequency components computed by the filter processing data are different. Therefore, upon comparing Hs and Vs, if Vs is found to be smaller, it indicates that the filter processing data from which DfV is obtained is related to a higher frequency component than the filter processing data to which DfH is related, further indicating that DfV is related to a higher frequency component of the object. In this case, the program moves to step S507 to choose DfV as the final defocus amount DfL. Conversely, if Hs is smaller than Vs, it indicates that DfH is obtained from the object containing a higher frequency component; hence, in this case, the program moves to step S506 to choose DfH as the final defocus amount DfL. At step S506, the process is completed with the horizontal defocus amount DfH chosen as the final defocus amount DfL. On the other hand, at step S507, the process is completed with the vertical defocus amount DfV chosen as the final defocus amount DfL.

All the operations described above are operations of the focus detection determination circuit 5. If the types of filter processing algorithm are the same at step S504, the one showing a closer distance is chosen, but the present invention is not limited to this selection method. It is equally permissible to choose the one with a larger E-value or, if both display roughly the same distances, the average of the two can be used as the final defocus amount DfL or one can be preferred over the other.

In the embodiment described above, the values of s in formulae (8) are assigned to be 2, 4, and 8 in the filter processing algorithm to compute high frequency, medium frequency, and low frequency related filter processing data, respectively, but the value of s is not limited to the above embodiment. Moreover, while the number of filters in the above embodiment is three, the number could be two or more than three. Furthermore, the filtering values processing algorithms for the horizontal defocus amount computation and the vertical defocus amount computation is the same, but a different type can also be used.

In the embodiment described above, the reduction rates as well as the pitch widths of the photo-electric conversion elements for the horizontal direction and the vertical direction are made to equal each other, but sometimes the frequencies being examined are different, especially if at least one of the values is different, even if the value of s is the same in formulae (8). In such a case, the values of s in formulae (8) can be made to differ in the horizontal direction and in the vertical direction so that the frequencies being examined by each of the filter processing algorithms, high frequencies, medium frequencies, and low frequencies, are approximately equal in the horizontal direction and in the vertical direction.

Figure 10A:
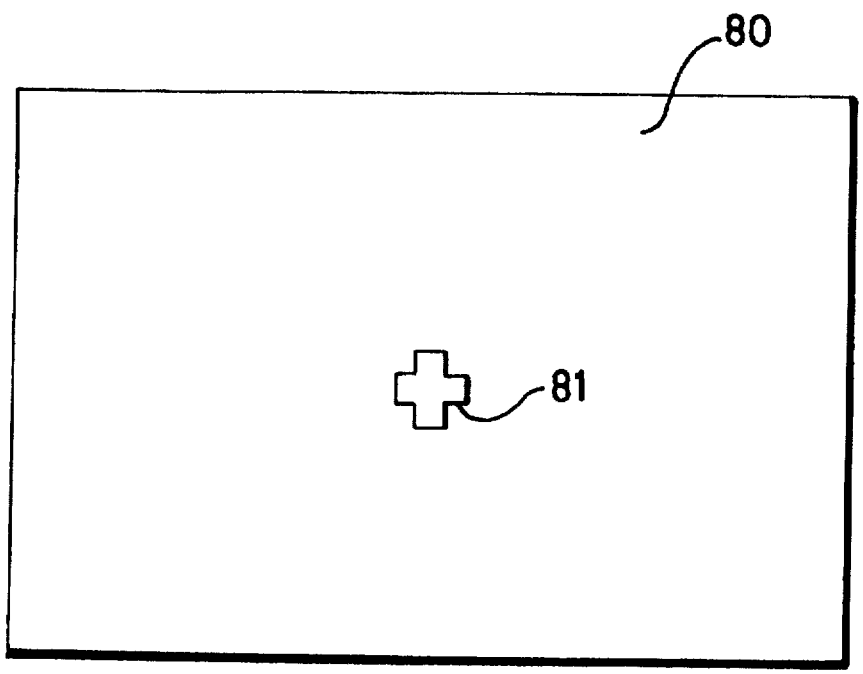
FIGS. 10(a)–10(b) are drawings showing the positional relationship between the phototaking field and the focus detection region.
Figure 10B:
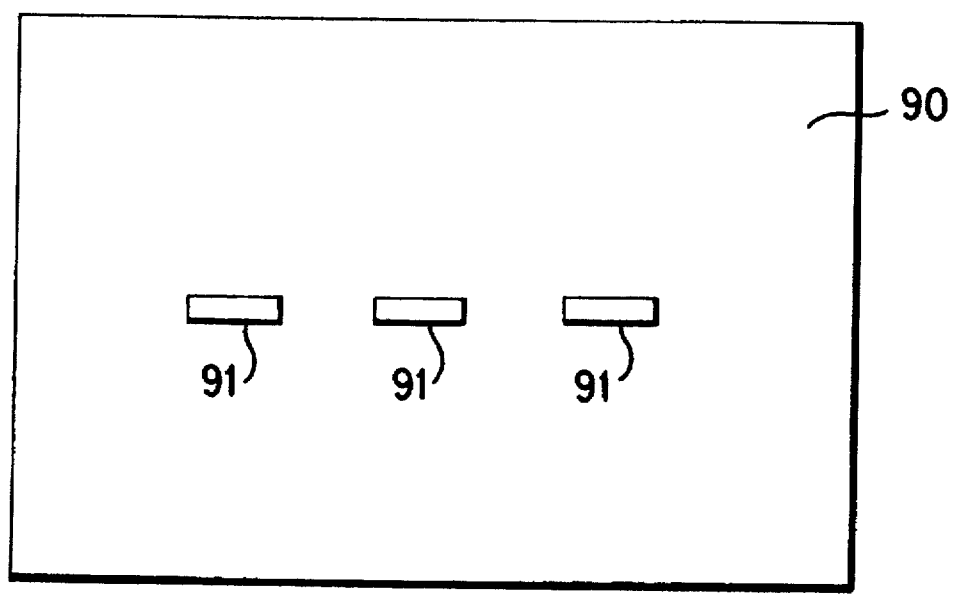
Figure 11:
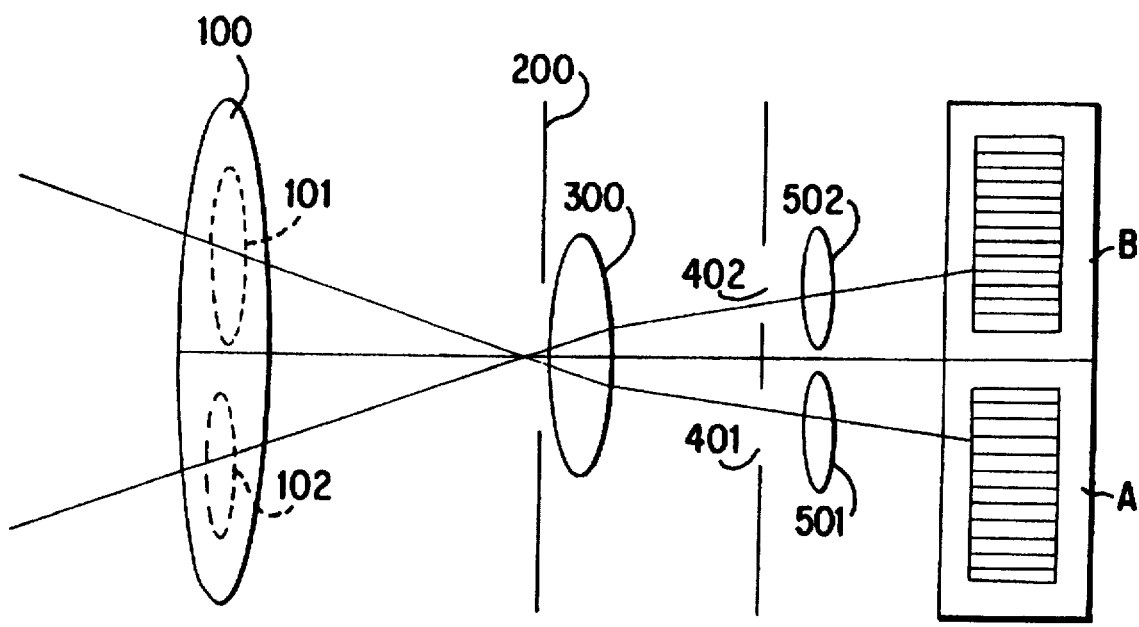
FIG. 11 is a drawing showing an overview of a related art focus detection optical system.
Figure 12:
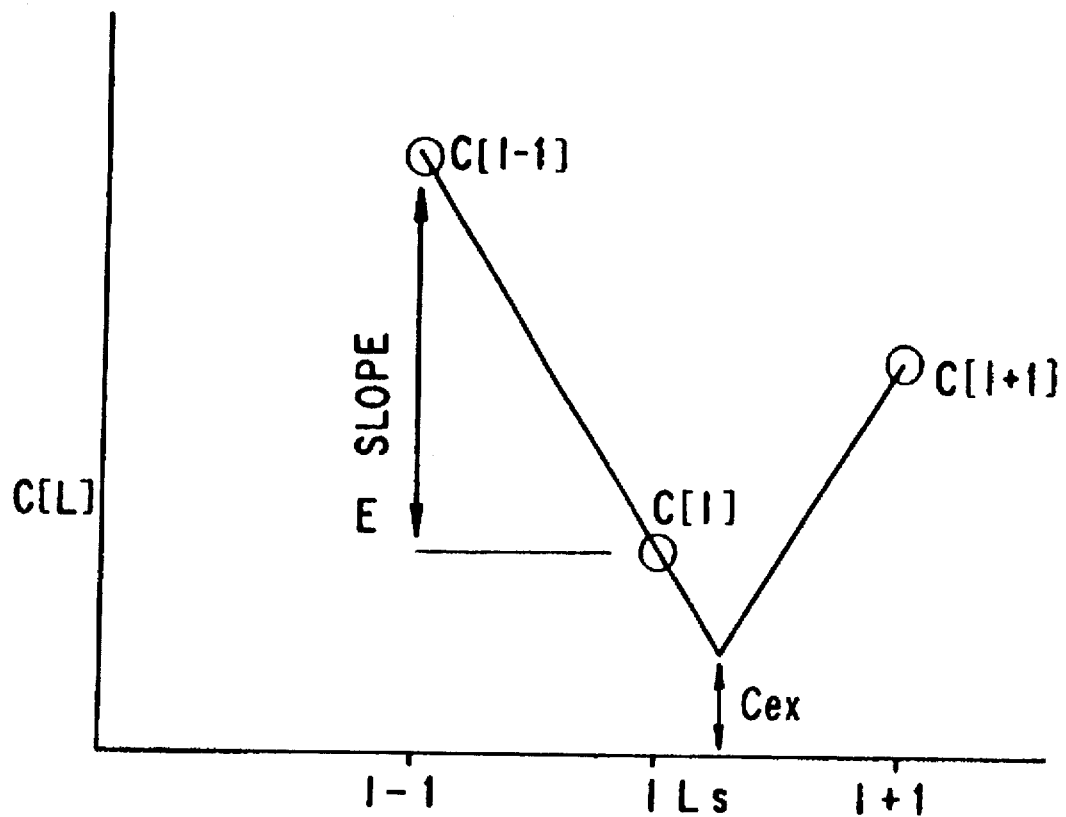
FIG. 12 is a drawing illustrating a related art focus detection algorithm.
Figure 13A:
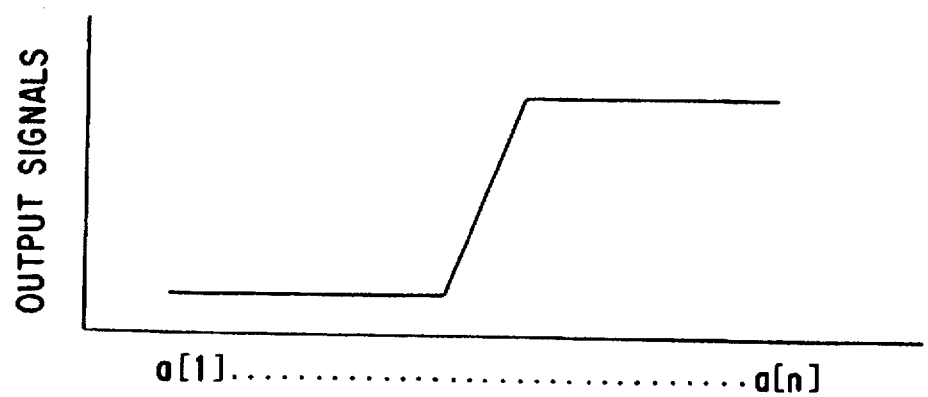
FIG. 13(a)–13(c) are graphs illustrating output signal strings and correlation amounts for a related art focus detection algorithm.
Figure 13B:
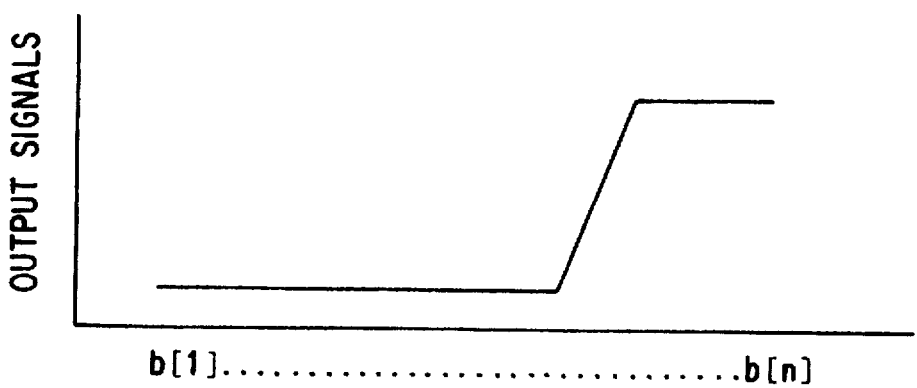
Figure 13C:
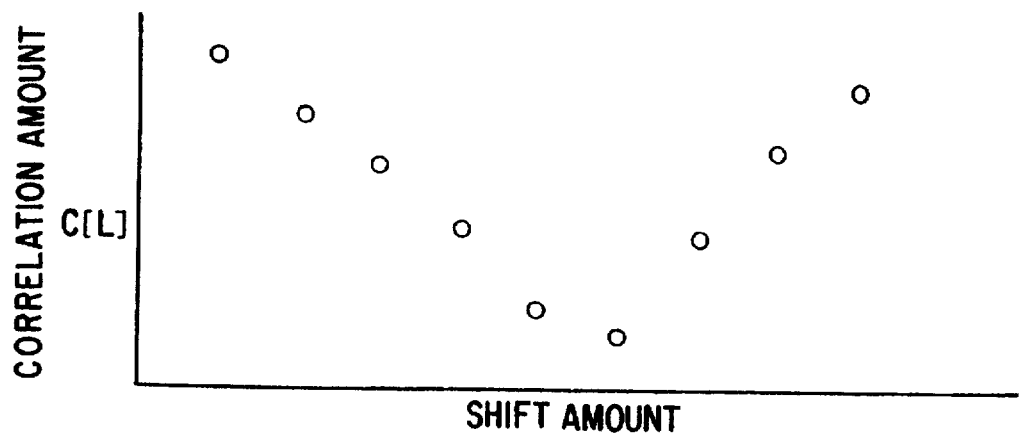
Figure 14A:
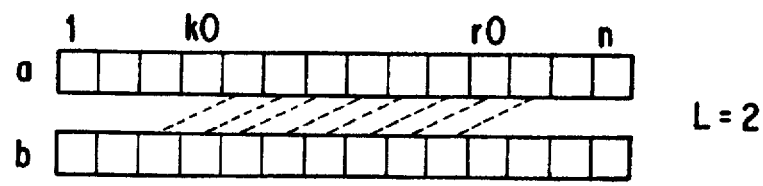
FIGS. 14(a)–14(e) are drawings illustrating a related art correlation algorithm.
Figure 14B:
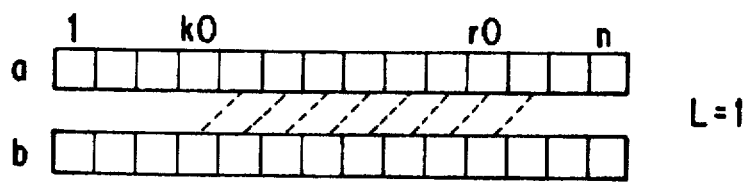
Figure 14C:
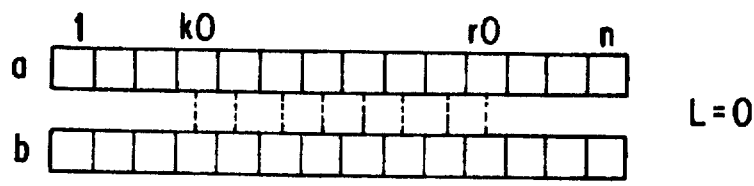
Figure 14D:
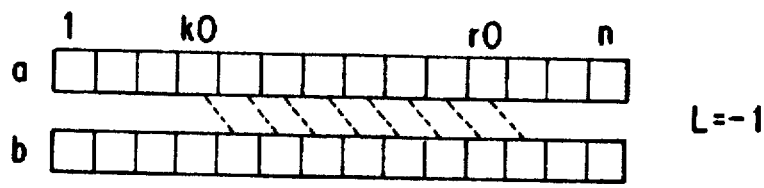
Figure 14E:
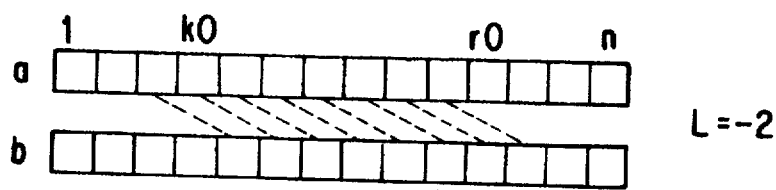
Figure 15:
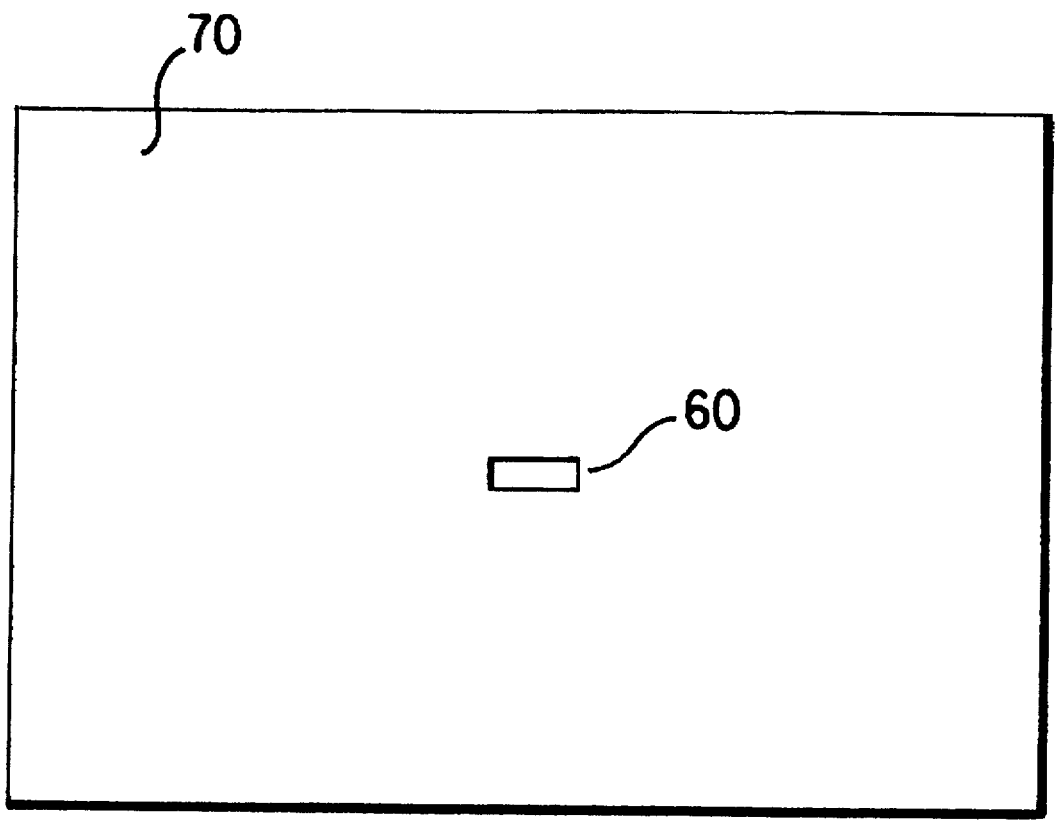
FIG. 15 is a drawing showing the positional relationship between a related art phototaking field and a focus detection region.

Moreover, the embodiment described above is an example of a focus detection device having two focus detection areas, one in the horizontal direction and the other in the vertical direction, crossing each other in the phototaking field, as shown in FIG. 10(a), but the present invention can be applied to a focus detection device having a plurality of focus detection areas in the phototaking field, as described in FIG. 10(b).

In the structure of the embodiment described above, the object image detection circuit 2 makes up a photo-electric conversion device; the filter processing circuit 3, a filter processing device; the focus detection algorithm circuit 4, a focus detection algorithm device; and the focus detection determination circuit 5 makes up a final focus determination device, respectively.

As described above, in the present invention, the final focus adjustment condition is determined based on the focus adjustment condition and the frequency of the components of each focus detection area by first computing filter processing data corresponding to a particular frequency by using the photo-electric conversion signals in each of the plurality of focus detection areas, by computing the focus adjustment condition of the phototaking lens based on the above signals, and by preferring the focus adjustment condition computed based on filter processing data corresponding to high frequencies. In this manner, the final focus adjustment condition with a highly accurate focus detection may be obtained from a plurality of focus adjustment conditions detected in a plurality of focus detection areas, resulting in improvement in the level of confidence of focus detection.

In computing the filter processing data from the output signals of the photo-electric conversion device above, the focus adjustment condition is computed by computing a high frequency component initially, then by repeating the computation of the focus adjustment condition with a reduced frequency until the predetermined level of confidence is obtained in the result of the computation. In this manner, once the predetermined level of confidence is obtained in the result of the focus adjustment computation related to a high frequency, the computation of the focus adjustment condition based on lower frequencies can be omitted, reducing the burden of computations and shortening the focus detection time.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device having a phototaking lens, comprising:

a plurality of focus detection areas within an image field of an object;

a plurality of photo-electric conversion devices, each of said photo-electric devices corresponding to each of said focus detection areas;

a focus detection optical system guiding light rays from said object to said photo-electric conversion devices, wherein each of said photo-electric devices outputs electrical signals corresponding to the light intensity distribution of said focus detection areas;

a filter processing device that utilizes a plurality of filter algorithm processes for extracting a plurality of frequency components, said filter processing device generating filter processing data corresponding to said frequency components for each of the electrical signals, the filter processing device outputting a plurality of filter processing data that corresponds to said focus detection areas;

a focus detection algorithm device that calculates focus adjustment condition signals for each of said filter processing data, the focus adjustment condition signals representing focus adjustment conditions of said phototaking lens at each of said focus detection areas; and a final focus determination device that determines a final focus adjustment condition signal based on focus adjustment condition signals calculated by the focus detection algorithm device using filter processing data that corresponds to the highest frequency component among the plurality of filter processing data.

2. A focus detection device according to claim 1, wherein for each of said electrical signals said filter processing device extracts successively lower frequency components and said focus detection algorithm device successively determines a corresponding focus adjustment condition until a focus adjustment condition having a predetermined confidence level is obtained.

3. A focus detection device according to claim 1, wherein said filter processing device comprises a filter processing circuit, said focus detection algorithm device comprises a focus detection algorithm circuit, and said final focus determination device comprises a focus detection determination circuit.

4. A focus detection device according to claim 1, wherein said focus adjustment conditions comprise defocus amounts.

5. A focus detection device according to claim 4, wherein said defocus amounts comprise defocus amounts along perpendicular directions in said image field.

6. A focus detection device having a phototaking lens, comprising:

a plurality of photo-electric conversion means for converting light into electrical signals, each of said photo-electric means corresponding to respective focus detection areas and said electrical signals corresponding to light intensity distributions on said focus detection areas;

optical means for guiding light rays from an object to said plurality of photo-electric conversion means to determine said light intensity distributions;

filter processing means that utilizes a plurality of filter algorithm processes for extracting a plurality of frequency components, said filter processing means generating filter processing data corresponding to said frequency components for each of the electrical signals, the filter processing means outputting a plurality of filter processing data that corresponds to said focus detection areas;

focus detection algorithm means that calculates focus adjustment condition signals for each of said filter processing data, the focus adjustment condition signals representing focus adjustment conditions of said phototaking lens at each of said focus detection areas; and final focus determination means that determines a final focus adjustment condition signal based on focus adjustment condition signals calculated by the focus detection algorithm device using filter processing data that corresponds to the highest frequency component among the plurality of filter processing data.

7. A focus detection device according to claim 6, wherein for each of said electrical signals said filter processing means extracts successively lower frequency components and said focus detection algorithm means successively determines a corresponding focus adjustment condition until a focus adjustment condition having a predetermined confidence level is obtained.

8. A focus detection device according to claim 6, wherein said filter processing means comprises a filter processing circuit, said focus detection algorithm device comprises a focus detection algorithm circuit, and said final focus determination device comprises a focus detection determination circuit.

9. A focus detection device according to claim 6, wherein said focus adjustment conditions comprise defocus amounts.

10. A focus detection device according to claim 9, wherein said defocus amounts comprise defocus amounts along perpendicular directions in said image field.

11. A method of determining a final defocus amount in a focus detection device having a phototaking lens, comprising the steps of:

providing a plurality of focus detection areas within an image field of an object;

providing a plurality of photo-electric conversion devices, each of said photo-electric devices corresponding to each of said focus detection areas;

guiding light rays from said object to said photo-electric conversion devices, wherein each of said photo-electric devices outputs electrical signals corresponding to the light intensity distribution of said focus detection areas;

utilizing each of said electrical signals to generate filter processing data by conducting one of a plurality of filter algorithm processes that extracts various frequency components and outputting a plurality of filter processing data that correspond to said focus detection areas;

calculating focus adjustment condition signals that represent focus adjustment conditions of said phototaking lens at each of said focus detection areas by each of said filter processing data; and determining a final focus adjustment condition signal that represents a final focus adjustment condition of said phototaking lens, based on said focus adjustment condition signals and said filter algorithm processes.

12. The method of claim 11, further comprising the step of determining said final focus adjustment condition based on focus adjustment condition signals calculated by filter processing data that includes the highest frequency component among said plurality of filter processing data.

13. The method of claim 11, wherein said converting step comprises the steps of extracting successively lower frequency components and successively determining a focus adjustment condition until a focus adjustment condition having a predetermined confidence level is obtained.

14. The method of claim 12, wherein said converting step comprises the steps of extracting successively lower frequency components and successively determining a focus adjustment condition until a focus adjustment condition having a predetermined confidence level is obtained.

15. The method of claim 11, wherein said calculating step calculates focus adjustment conditions that represent defocus amounts.

16. The method of claim 11, further comprising the step of determining when a focus adjustment condition cannot be computed.

* * * * *